(12) United States Patent
Zeilinger (10) Patent No.: US 6,302,801 B1
(45) Date of Patent: Oct. 16, 2001

(54) SWING SET BRACKET

(75) Inventor: Brian K. Zeilinger, Janesville, WI (US)

(73) Assignee: Playstar, Inc., Janesville, WI (US)

( * ) Notice: Subject to any disclaimer, the term of this patent is extended or adjusted under 35 U.S.C. 154(b) by 0 days.

(21) Appl. No.: 09/466,315

(22) Filed: Dec. 17, 1999

Related U.S. Application Data (63) Continuation-in-part of application No. 09/289,042, filed on Apr. 9, 1999, now Pat. No. 6,039,654.

(51) Int. Cl.[7] .................................................. A63G 9/00
(52) U.S. Cl. ........................... 472/118; 472/125; 248/165
(58) Field of Search ................................. 472/118, 119, 472/120, 121, 122, 123, 124, 125; 403/403, 232.1; 248/165, 370, 163.1, 163.2

(56) References Cited

U.S. PATENT DOCUMENTS

| | | | |
|---|---|---|---|
| D. 160,320 | 10/1950 | Horowitz | D34/5 |
| D. 174,847 | 5/1955 | Ahrens | D34/5 |
| D. 244,704 | 6/1977 | Smyrni et al. | D34/5 |
| D. 286,423 | 10/1986 | Saxman et al. | D21/244 |
| 1,729,529 | 9/1929 | Whitman . | |
| 2,151,403 | 3/1939 | Burke | 272/57 |
| 2,517,207 | 8/1950 | Hugueny | 155/62 |
| 3,145,013 | 8/1964 | Grudoski | 248/370 |
| 3,503,582 | 3/1970 | Boucher | 248/370 |
| 3,704,849 | 12/1972 | Green | 248/165 |
| 3,825,254 | 7/1974 | McGuire | 272/85 |
| 3,925,954 * | 12/1975 | Snow et al. | 52/752 |
| 4,094,503 | 6/1978 | Wormser | 272/85 |
| 4,190,283 | 2/1980 | Boucher | 297/77 |
| 4,256,300 | 3/1981 | Boucher | 282/85 |
| 4,966,309 | 10/1990 | Baer | 272/85 |
| 5,016,873 | 5/1991 | Bossa | 272/85 |
| 5,364,312 | 11/1994 | Cunard et al. | 472/118 |
| 5,380,116 * | 1/1995 | Colonias | 403/232.1 |

OTHER PUBLICATIONS

The Amazing Imagination Machines, Dallas Custom Swings, Creative Playthings, Backyard Playset Collection Playkids Playgrounds, Playkids Manufacturing Inc. Miami, Florida (1996).

* cited by examiner

Primary Examiner—Kien T. Nguyen
(74) Attorney, Agent, or Firm—Michael Best & Friedrich LLP

(57) ABSTRACT

The invention provides a playstation that is configured to be stronger, less expensive to manufacture, and easier to assemble. The playstation includes a Y-shaped support that has a top section, a lower left section and a lower right section. The playstation also includes a cross-beam having a first cross-beam secured to the left side of the top section on the Y-shaped support and a second cross-beam secured to the right side of the top section on the Y-shaped support. The playstation further includes a left leg secured to the lower left section of the Y-shaped support and a right leg secured to the lower right section of the Y-shaped support. Using the Y-shaped support of the present invention allows the playstation to be readily assembled. The assembled playstation also provides a solid support structure for securing one or more children's accessories to the playstation.

44 Claims, 8 Drawing Sheets

SWING SET BRACKET

CROSS-REFERENCE TO RELATED APPLICATIONS

This application is a continuation-in-part of U.S. patent application Ser. No. 09/289,042 which was filed Apr. 9, 1999 now U.S. Pat. No. 6,039,654.

BACKGROUND OF THE INVENTION

The present invention relates to a playstation, and particularly, to a playstation that is configured to be stronger, less expensive to manufacture, and easier to assemble.

Playstations are typically used as a framework onto which various children's play accessories (e.g., swings, slides, climbing towers, etc.) are secured. The children's accessories are attached to the playstations in any number of configurations.

Playstations are commonly sold to consumers as a conglomeration of unassembled parts in order to facilitate shipping and handling of the playstation. As a result, the playstation is assembled by the ultimate user at the desired location. The number, size, and complexity of the parts makes assembling conventional playstations extremely cumbersome.

Typical playstations include one or more horizontal cross-beams that are supported by one or more support structures. The cross-beams are usually either metal (e.g., tubular metal) or wood (e.g., a single 4×4 beam or 2 parallel 2×6 timbers). The support structures include one or more brackets fastened to supports, or legs (commonly in an A-frame configuration).

One of the problems associated with conventional brackets is that they have elaborate configurations making them costly to manufacture. Another problem with conventional brackets is that the elaborate configurations add to the difficulty associated with assembling the playstations. The brackets are typically difficult to align due to the lack of any structural formations on the brackets that can be used to align the brackets relative to the other components that make up the playstation. Several conventional brackets are disclosed in U.S. Pat. Nos. 4,190,283 and 5,364,312.

SUMMARY OF THE INVENTION

Accordingly, the invention provides a playstation that is configured to be stronger, less expensive to manufacture, and easier to assemble. The playstation includes a Y-shaped support that has a top section, a lower left section, and a lower right section. The playstation also includes a first cross-beam secured to the left side of the top section on the Y-shaped support and a second cross-beam secured to the right side of the top section on the Y-shaped support. The playstation further includes a left leg secured to the lower left section of the Y-shaped support and a right leg secured to the lower right section of the Y-shaped support.

Using the Y-shaped support of the present invention allows the playstation to be readily assembled. The assembled playstation also provides a solid support structure for securing one or more children's accessories to the playstation.

The Y-shaped support is preferably secured to one end of the first and second cross-beams while a support structure (which could include another Y-shaped support) is secured to the opposite end of the cross-beams, although the Y-shaped support could be secured to any point along either cross-beam.

The Y-shaped support is preferably assembled from a left bracket and a right bracket where each of the brackets includes an upper portion and a lower portion. The upper portions of the left and right brackets are secured together to form the top section of the Y-shaped support such that the lower portion of the left bracket becomes the lower left section of the Y-shaped support and the lower portion of the right bracket becomes the lower right section of the Y-shaped support. A plurality of conventional fasteners connect the upper portions of the brackets together, although the brackets can be connected together by a single fastener.

The left and right brackets preferably include one or more pairs of axially aligned openings where one of the openings is larger than the other opening. Fasteners extends through each pair of openings in order to secure the bracket that has the smaller opening to one of the cross-beams. The heads of the fasteners fit within the larger openings of the other bracket. Recessing the heads of the fasteners within the larger openings in the other bracket allows the unsecured cross-beam to be placed flush against the other bracket. Once properly positioned against the other bracket, the unsecured cross-beam is connected to the already secured cross-beam by the use of fasteners or some other means commonly known in the art.

In another form of the invention, the first and second cross-beams are positioned against the top section of the Y-shaped support such that the first and second cross-beams are substantially parallel. The first and second cross-beams are aligned relative to one another and the Y-shaped support by positioning the cross-beams against the fasteners that are used to secure the left and right brackets of the Y-shaped support together.

In yet another form of the invention, the Y-shaped support includes one or more embosses that protrude from the surface of the Y-shaped support. The embosses are positioned to provide alignment for mounting the cross-beams and/or the legs to the Y-shaped support by providing a surface that abuts the leg and/or cross-beam when either of these articles is mounted to the Y-shaped support.

In another aspect, the present invention provides a playstation that includes an angled bracket, a first cross-beam and a second cross-beam. The angled bracket includes an upper section and a lower section extending downward from the upper section. The upper section of the angled bracket is secured between the first and second cross-beams. The playstation further includes a leg that is secured to the lower section of the angled bracket and a support structure that is secured to the first cross-beam, the second cross-beam and the upper section of the angled bracket.

In a preferred form of the invention, the support structure is a tower that includes a landing for supporting a child. The tower is secured to the first cross-beam, the second cross-beam and the upper section of the angled bracket at a position above the landing on the tower.

A principal advantage of the invention is to provide a playstation that is easily assembled.

Another advantage of the invention is to provide a playstation that includes parts which are easy to fabricate.

Another advantage of the invention is to provide a playstation that is sturdy enough to act as a support structure for one or more children's play accessories.

Other features and advantages of the invention are set forth in the following drawings, detail description and claims.

BRIEF DESCRIPTION OF THE DRAWINGS

FIG. 2 is an end view of one form of the Y-shaped support that is used in the playstation of the present invention.

The foregoing description of the present invention has been presented for purposes of illustration and description. The description is not intended to limit the invention to the form disclosed herein. Consequently, variations and modifications commensurate with the above teachings, and the skill or knowledge of the prior art, are within the scope of the present invention. The embodiments described herein are intended to explain the best modes for practicing the invention and to enable others skilled in the art to utilize the invention and the disclosed or other embodiments, and with various modifications required by the particular applications or uses of the present invention. It is intended that the appended claims be construed to include alternative embodiments to the extent permitted by the prior art.

DETAILED DESCRIPTION OF THE PREFERRED EMBODIMENTS

Figure 1:
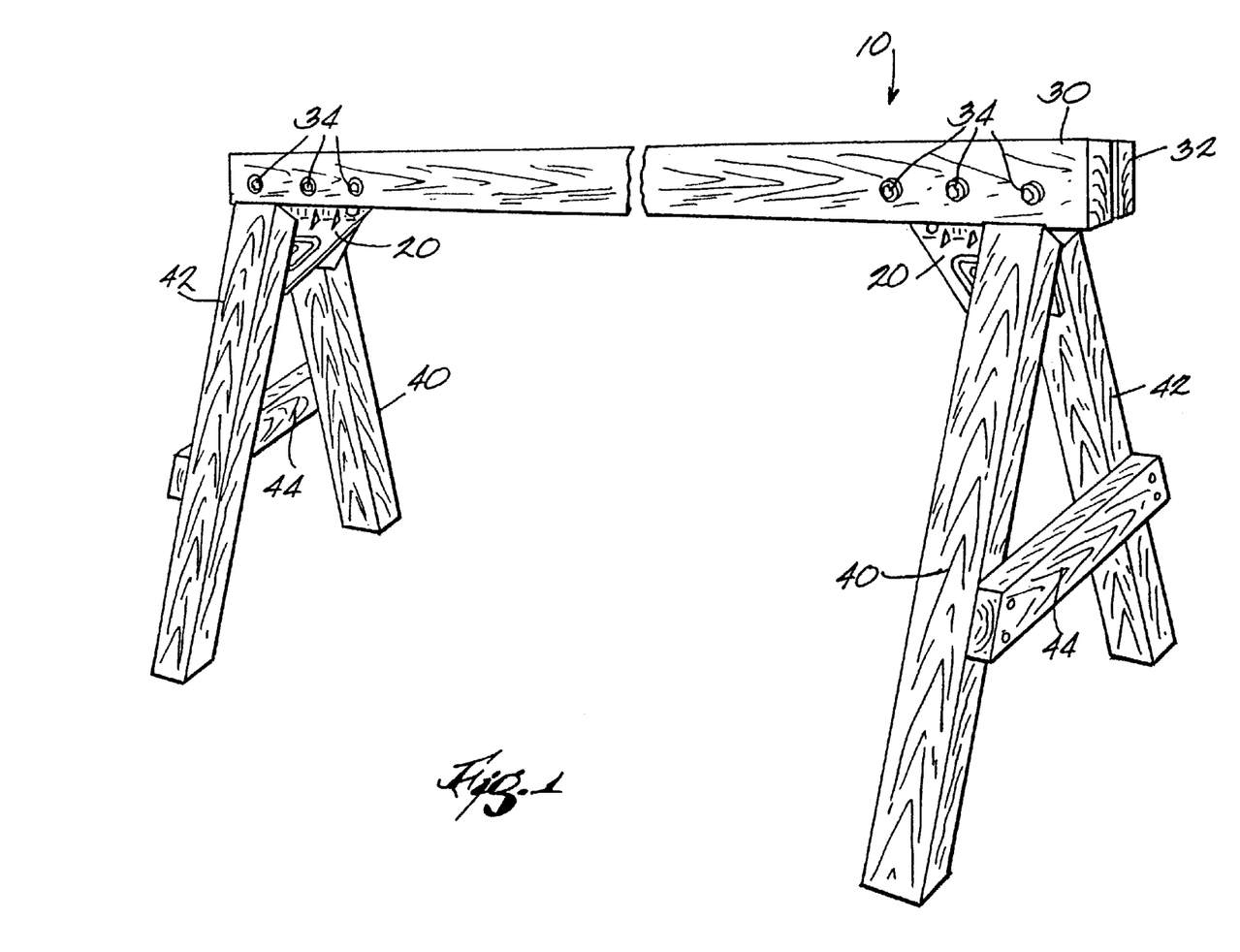
FIG. 1 is a perspective view of a playstation of the present invention.
Figure 3:
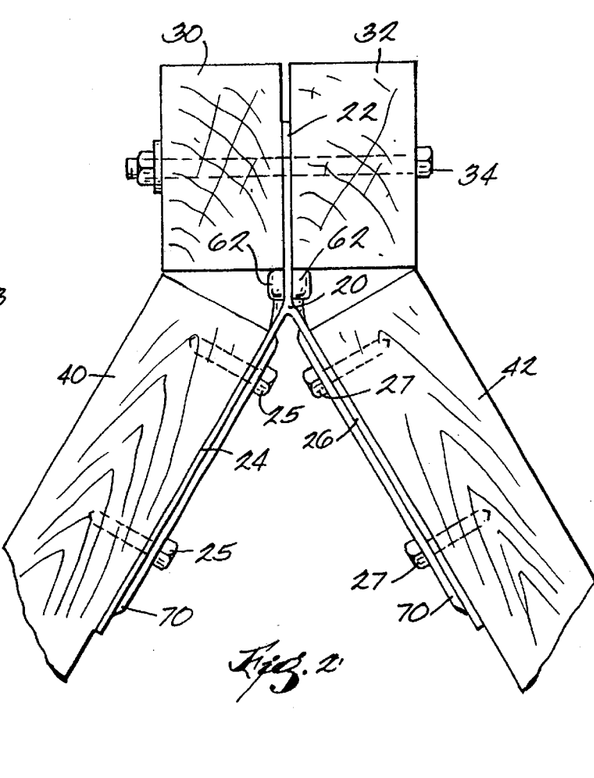
FIG. 3 is an enlarged end view of the top of the playstation of FIG. 1.

A playstation 10 of the present invention is shown in FIG. 1. The playstation 10 includes a Y-shaped support 20 secured between a first cross-beam 30 and a second cross-beam 32. The first cross-beam 30 and the second cross-beam 32 are secured together using fasteners 34. The playstation 10 further includes left legs 40 and right legs 42 that are connected to respective Y-shaped supports 20. The embodiment illustrated in FIG. 1 includes center supports 44 extending between the left legs 40 and the right legs 42 to provide further support to the playstation 10. While in FIG. 1, Y-shaped support 20 is mounted on each end of the first cross-beam 30 and the second cross-beam 32, it should be understood that a single Y-shaped support 20 can be mounted anywhere along the length of the first cross-beam 30 or the second cross-beam 32. In such a situation (not shown), the free end of the cross-beam is connected to other suitable support structure(s).

One form of the Y-shaped support 20 that is used in the playstation 10 is shown in FIG. 2. The Y-shaped support 20 includes a top section 22, a lower left section 24 and a lower right section 26. The first cross-beam 30 is positioned against one side of the top section 22 and the second cross-beam 32 is positioned against the opposite side of the top section 22. The left leg 40 is secured to the lower left section 24 using fasteners 25 and the right leg 42 is secured to the lower right section 26 using fasteners 27.

FIGS. 3–6 illustrates another form of the Y-shaped support 20 wherein the Y-shaped support 20 includes a left bracket 41 and a right bracket 43. The left bracket 41 includes an upper portion 50 and a lower portion 52, while the right bracket 43 includes an upper portion 51 and a lower portion 53. The upper portion 50 of the left bracket 41 is secured to the upper portion 51 of the right bracket 43 to form the top section 22 of the Y-shaped support 20 (See FIG. 3). Except where noted specifically below, the left bracket 41 and the right bracket 43 are mirror images of one another, and accordingly, only the left bracket 41 will be described in detail.

Figure 4:
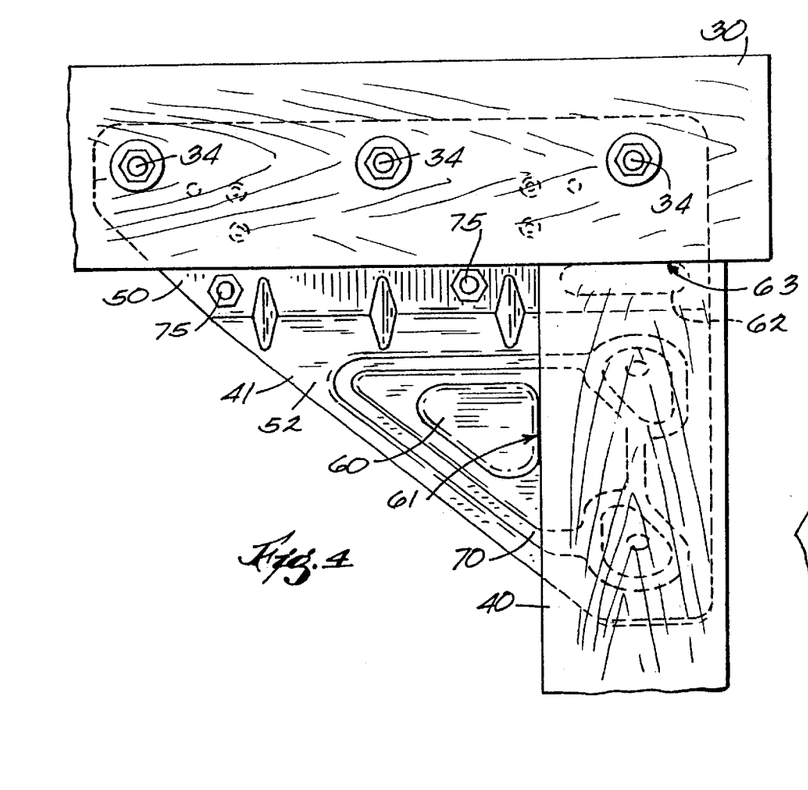
FIG. 4 is an enlarged plan view of an upper section of the playstation of FIG. 1.
Figure 5:
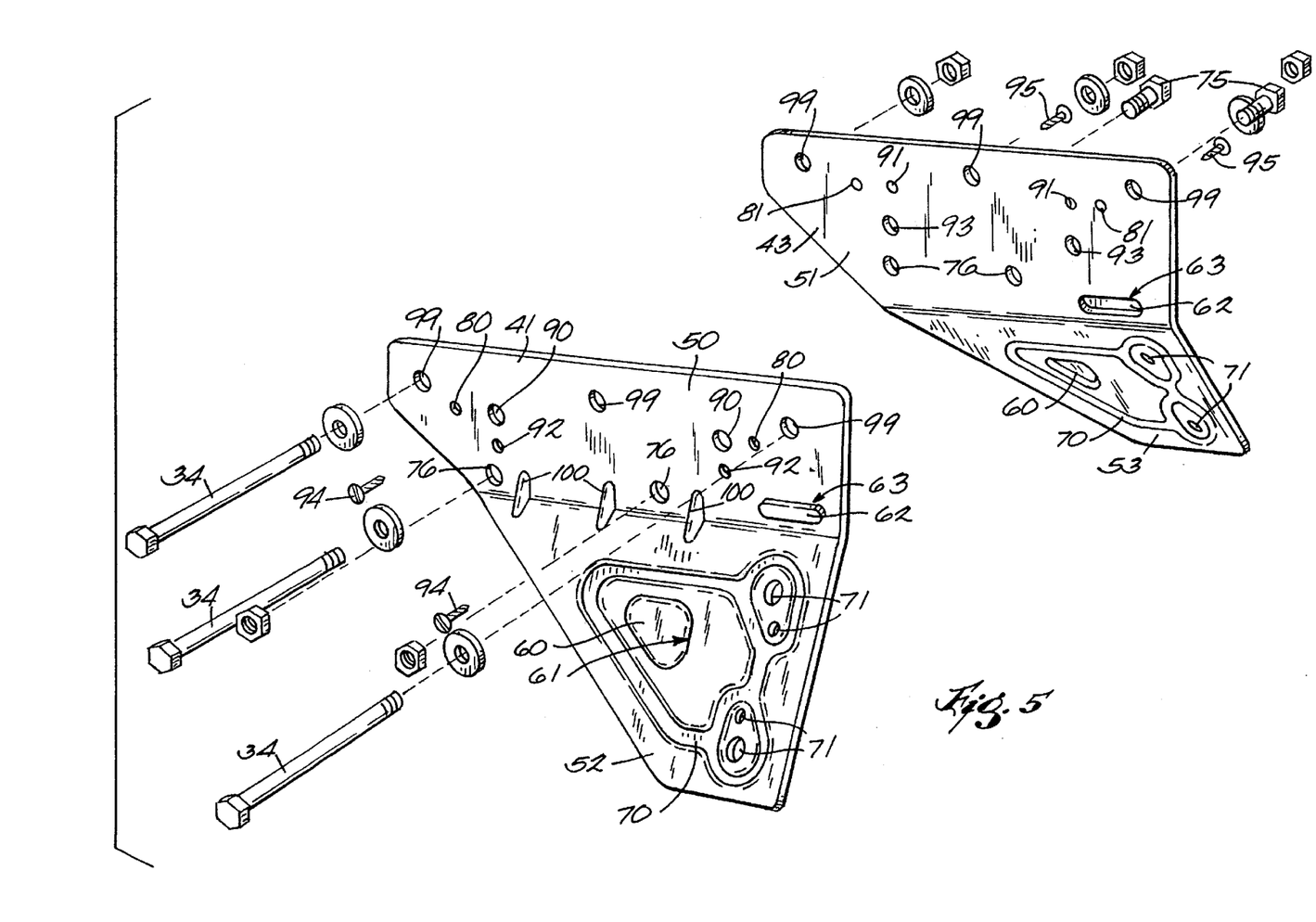
FIG. 5 is a perspective view of a preferred form of a left and right bracket that could be used to form the Y-shaped support.

As shown most clearly in FIGS. 4 and 5, the left bracket 41 includes an emboss 60 that serves to align the left leg 40 of the playstation 10 during assembly. The emboss 60 includes an abutment surface 61 that is positioned against the left leg 40 when the left leg 40 is assembled to the left bracket 41.

The left bracket 41 also includes an emboss 62 located on the upper portion 50 (see FIG. 4). The emboss 62 serves to align the first cross-beam 30 of the playstation 10 during assembly. The emboss 62 includes an abutment surface 63 that is positioned against the first cross-beam 30 when the first cross-beam 30 is assembled to either the Y-shaped support 20 or the second cross-beam 32.

The left bracket 41 also includes an emboss pattern 70 that extends up from the inner surface of the lower portion 52. The emboss pattern 70 includes openings 71 therein such that the fasteners 25 extend through the openings 71 into the left leg 40 in order to secure the lower portion 52 to the left leg 40.

The upper portion 50 of the left bracket 41 and the upper portion 51 of the right bracket 43 are fastened together by extending fasteners 75 through identically matching openings 76 in the left bracket 41 and the right bracket 43. Once the left bracket 41 and the right bracket 43 are secured together, the fasteners 75 serve as an abutment surface for the first cross-beam 30 and/or the second cross-beam 32 when they are assembled as part of the playstation 10 (see FIG. 4).

Figures 6, 7:
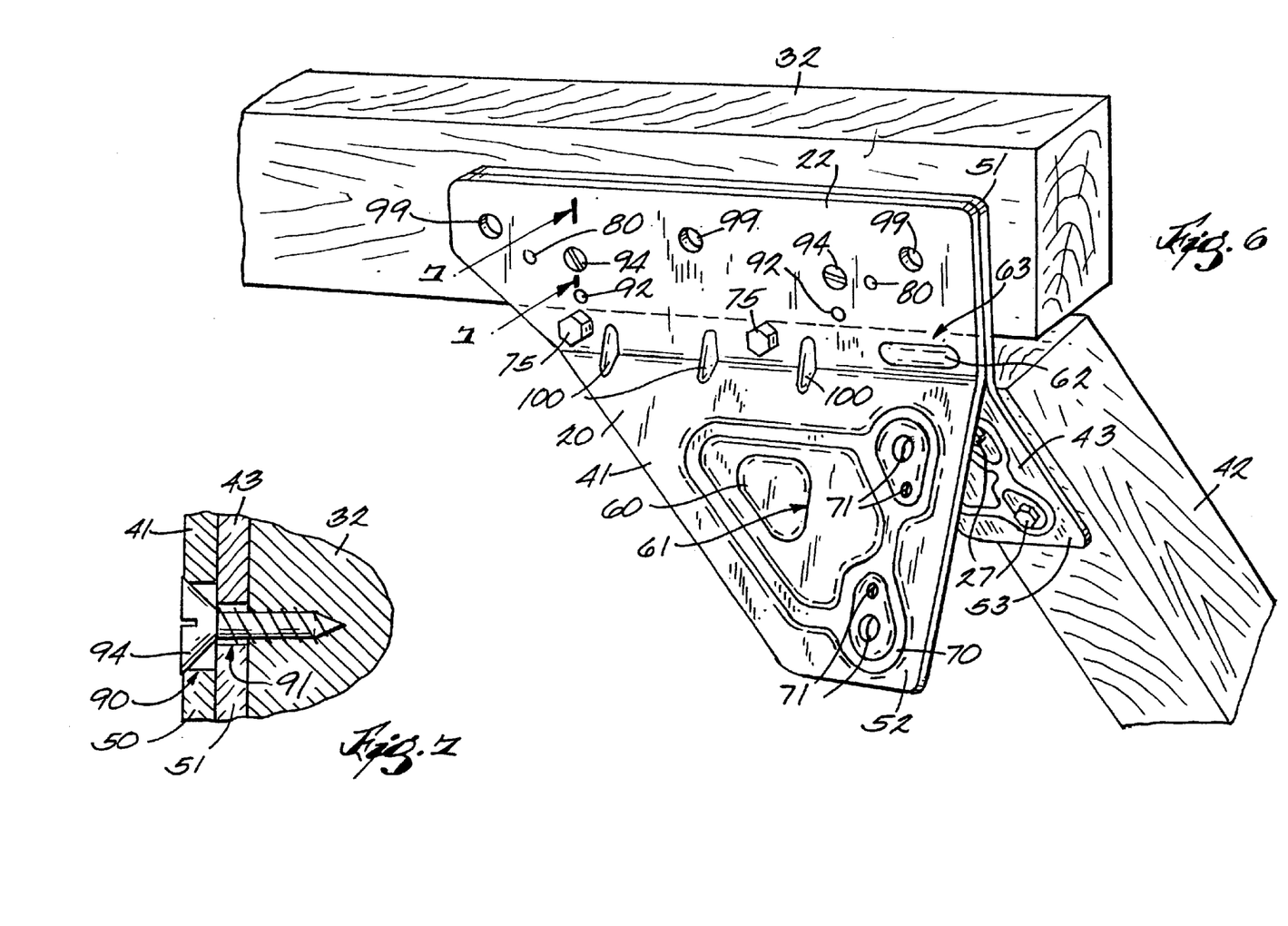
FIG. 6 is a perspective view of a portion of a partially assembled playstation.
FIG. 7 is a section view of a portion of the partially assembled playstation of FIG. 6 taken along line 7—7.

The left bracket 41 also includes webs 100 extending between the upper portion 50 and the lower portion 52 (see FIGS. 4–6). The webs 100 are designed to provide stability to the Y-shaped support 20.

The upper portion 50 of the left bracket 41 includes nipples 80 that extend outward from the inner surface of the upper portion 50 (see FIG. 4). The nipples 80 are designed to fit within openings 81 in the upper portion 51 of the right bracket 43 so that the left bracket 41 and the right bracket 43 are properly aligned before being fastened together. The location of the nipples 80 and the openings 81 could be reversed with respect to the left bracket 41 and the right bracket 43.

Once the left bracket 41 and the right bracket 43 are assembled together, the Y-shaped support 20 is attached to either the first cross-beam 30 or the second cross-beam 32. The process for assembling the Y-shaped support 20 to the cross-beam 32 is shown in FIGS. 5–7. The Y-shaped support 20 is secured to the first cross-beam 32 by extending fasteners 94 through the openings 90 in the left bracket 41 and openings 91 in the right bracket 43. The openings 90 are axially aligned with, and larger than, the openings 91 such that the heads of the fasteners fit within the larger openings 90. Recessing the heads of the fasteners 94 allows the first cross-beam 30 to be placed flush against the upper portion 50 of the left bracket 41 in order to assemble the first cross-beam 30 to the second cross-beam 32.

Alternatively, the first cross-beam 30 may be initially secured to the Y-shaped support instead of the second cross-beam 32. In this case, the fasteners 95 extend through openings 93 in the right bracket 43 and openings 92 in the left bracket 41 (shown only in FIGS. 5 and 6). The openings 93 in the right bracket 43 are axially aligned with, and larger than, the openings 92 in the left bracket 41 such that the heads of the fasteners 95 are recessed into the upper portion 51 of the right bracket 43. Recessing the heads of the fasteners in the right bracket 43 allows the second cross beam 32 to be placed flush against the upper portion 51 of the right bracket 43 in order to assemble the second cross-beam 32 to the first cross-beam 30. The first cross-beam 30 and the second cross-beam 32 are secured to each other and the Y-shaped support 20 by using fasteners 34 which extend through axially aligned openings 99 in the upper portion 50 of the left bracket 51 and the upper portion 51 of the right bracket 43.

Figure 8:
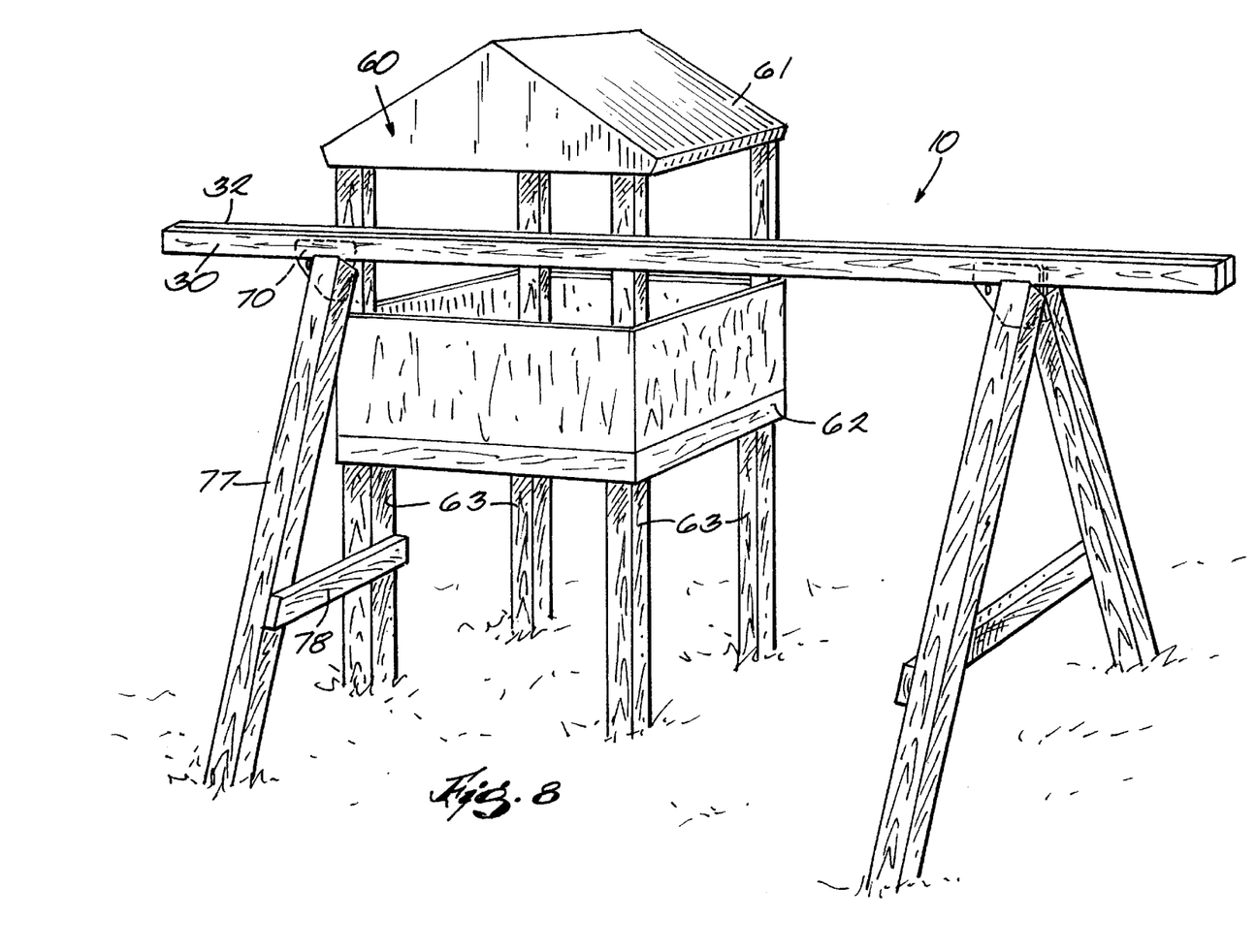
FIG. 8 is a perspective view of another form of the playstation of the present invention.

Another form of the playstation 10 is illustrated in FIG. 8. In this form, the playstation 10 is partially secured at one end to a tower 60. The tower 60 includes a roof 61 and a landing 62. The tower 60 is adapted so that a child (not shown) is able to stand under the roof 61 on the landing 62. The tower 60 includes one or more vertical support structures 63 and one of the vertical support structures 63 is secured to the playstation 10.

Figure 9:
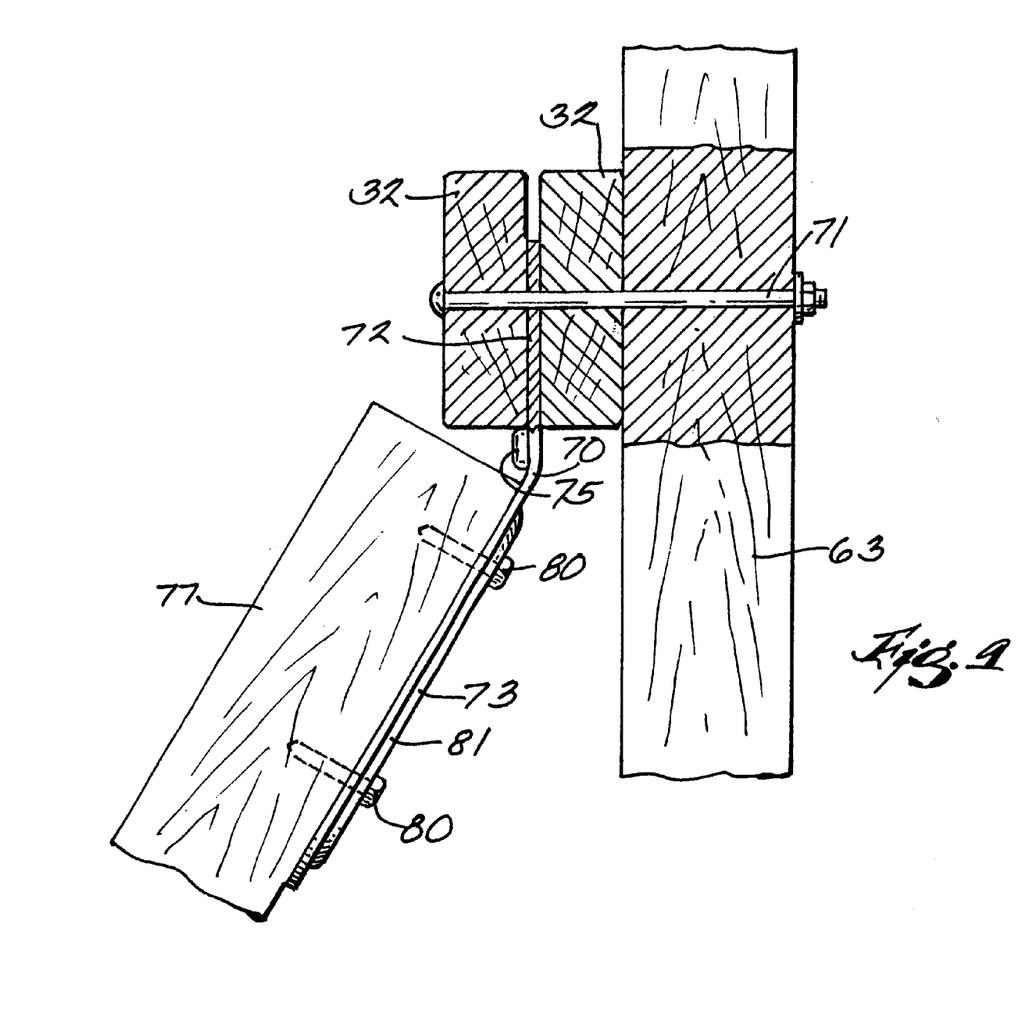
FIG. 9 is a partially-sectioned end view showing a portion of the playstation illustrated in FIG. 8.
Figure 10:
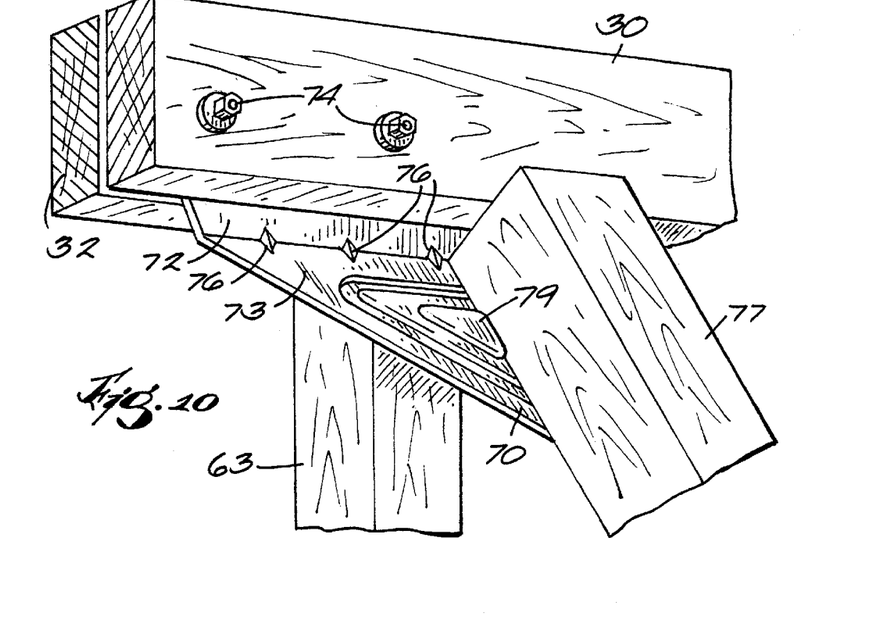
FIG. 10 is a perspective view from the front of the showing the portion of the playstation illustrated in FIG. 9.
Figure 11:
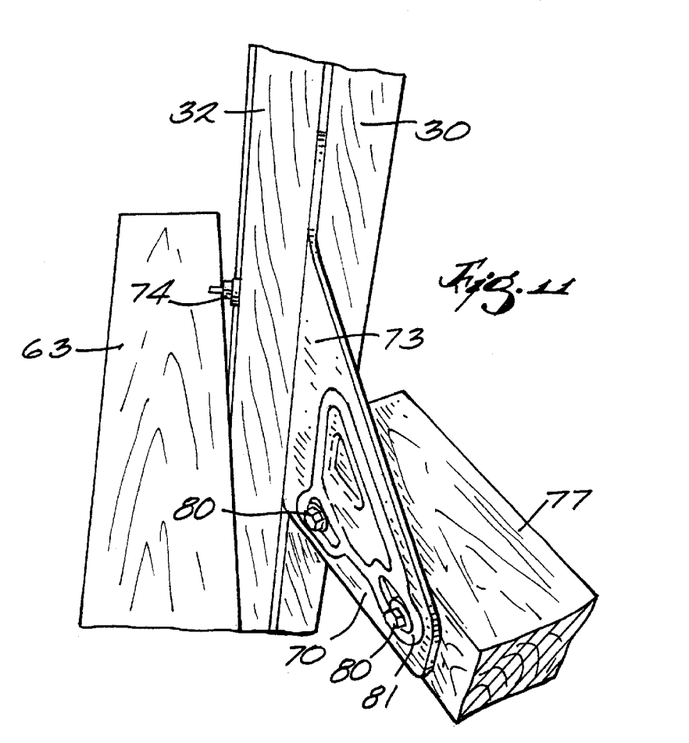
FIG. 11 is a perspective view from below the playstation showing the portion of the playstation illustrated in FIG. 9.

Referring now also to FIGS. 9–11, the support structure 63 is coupled to the first cross-beam 30, the second cross-beam 32 and an angled bracket 70 by a bolt and nut combination 71. The support structure 63 is preferably coupled to the playstation 10 in a position above the landing 62.

The angled bracket 70 preferably has a configuration similar to either the left bracket 51 or the right bracket 43 as illustrated in FIGS. 1–7. The angled bracket 70 includes an upper section 72 coupled between the first and second cross-beams 30, 32 and a lower section 73. The lower section 73 extends laterally and downwardly relative to the upper section 72 such that there is an angle (preferably ranging anywhere from 90° to 180°) between the upper section 72 and the lower section 73.

The first and second cross-beams 30, 32 and the angled bracket 70 are additionally secured to one another using fasteners 74. The first and second cross-beams 30, 32 are aligned relative to the angled bracket 70 by positioning the cross-beams 30, 32 against an emboss 75 (see FIG. 9) on the upper section 72 of the angled bracket 70. The cross-beams 30,32 are further aligned relative to the angled bracket 70 by positioning the cross-beams 30,32 against a plurality of embosses 76 (see FIG. 10) that extend between the upper section 72 and the lower section 73 of the angled bracket 70. In a preferred form, the cross beams 30, 32 include openings (not shown in FIGS.8–11) similar to the openings 76 in the left bracket 51 or the right bracket 43 as illustrated in FIGS. 1–7. A bolt and nut combination, or a pin, is inserted into the openings in order further align the cross-beams 30, 32 relative to the angled bracket 70.

The angled bracket 70 is also coupled to a leg 77 that extends laterally and downwardly from the first and second cross-beams 30, 32. In a preferred form, a center support 78 extends between the vertical support structure 63 on the tower 60 and the leg 77. The leg 77 is preferably aligned relative to the angled bracket 70 by placing the leg 77 against an emboss 79 (see FIG. 10) positioned on the outside surface of the angled bracket 70. In addition, the end of the leg 77 is positioned against the emboss 75 on the upper section 72 of the angled bracket 70 in order to align the end of the leg 77. The leg 77 is secured to the angled bracket 70 using fasteners 80. The angled bracket 70 preferably includes an emboss 81 that is adapted to receive the heads of the fasteners 80 therein.

Although the angled bracket 70 is shown as being positioned between the ends of the first and second cross-beams 30, 32, it should be understood that the angled bracket 70 and the tower 60 can be placed anywhere along the length of the cross-beams 30, 32 without departing from the scope of the present invention. The form of the playstation 10 illustrated in FIG. 8 has been shown for illustration purposes only and is not intended to limit the scope of the appended claims.

Various features and advantages of the present invention are set forth in the following claims.

What is claimed is:

1. A playstation comprising:
   an angled bracket including an upper section and a lower section extending downward from the upper section,
   a first cross-beam secured against the upper section of the angled bracket,
   a second cross-beam secured against the upper section of the angled bracket, the second cross-beam being substantially parallel to the first cross-beam,
   a leg secured to the lower section of the angled bracket, and
   a support structure including a plurality of support members, and wherein one of the support members is secured to the first cross-beam, the second cross-beam and the upper section of the angled bracket.

2. The playstation according to claim 1 wherein the first cross-beam includes a first end and a second end and the second cross-beam includes a first end and a second end, the angled bracket being positioned between the first and second ends of the first cross-beam and between the first and second ends of the second cross-beam.

3. The playstation according to claim 1 further comprising a center support extending between the support structure and the leg.

4. The playstation according to claim 1 further comprising a first fastener for securing the upper section of the angled bracket to one of the first cross-beam and the second cross-beam.

5. The playstation according to claim 4 further comprising a second fastener for securing the upper section of the angled bracket to the first cross-beam and the second cross-beam.

6. The playstation according to claim 1 wherein the angled bracket includes an emboss that serves to align one of the first cross-beam and the second cross-beam relative to the angled bracket when the cross-beam is placed against the emboss.

7. The playstation according to claim 6 wherein the emboss extends between the upper section and the lower section of the angled bracket.

8. The playstation according to claim 1 wherein the lower section of the angled bracket includes an emboss that serves to align the leg relative to the angled bracket when the leg is placed against the emboss.

9. The playstation according to claim 8 wherein the emboss includes a detent adapted to receive a head on a fastener, the fastener being used to secure the lower section of the angled bracket to the leg.

10. The playstation according to claim 1 wherein the support structure is a tower having a landing for supporting a child thereon.

11. The playstation according to claim 10 wherein the tower is secured to the first cross-beam, the second cross-beam and the upper section of the angled bracket at a position above the landing on the tower.

12. The playstation according to claim 1 wherein the lower section extends laterally and downwardly from the upper section to form an angle between the upper section and the lower section of the angled bracket.

13. The playstation according to claim 12 wherein the angle between the upper section and the lower section is between 90 degrees and 180 degrees.

14. The playstation according to claim 12 wherein the angle between the upper section and the lower section of the angled bracket is formed by bending the lower section relative to the upper section.

15. The playstation according to claim 12 wherein the angled bracket has a substantially triangular configuration prior to bending the lower section relative to the upper section.

16. The playstation according to claim 1 wherein the angled bracket is secured between the first cross-beam and the second cross-beam.

17. A playstation comprising:
   an angled bracket including an upper section and a lower section extending downward from the upper section,
   a first cross-beam secured against the upper section of the angled bracket,
   a second cross-beam secured against the upper section of the angled bracket, the second cross-beam being substantially parallel to the first cross-beam,
   a first fastener for securing the upper section of the angled bracket to one of the first cross-beam and the second cross-beam,
   a leg secured to the lower section of the angled bracket, and
   a support structure secured to the first cross-beam, the second cross-beam and the upper section of the angled bracket.

18. The playstation according to claim 17 further comprising a second fastener for securing the upper section of the angled bracket to the first cross-beam and the second cross-beam.

19. The playstation according to claim 17 further comprising a center support extending between the support structure and the leg.

20. The playstation according to claim 17 wherein the angled bracket includes an emboss that serves to align one of the first cross-beam and the second cross-beam relative to the angled bracket when the cross-beam is placed against the emboss.

21. The playstation according to claim 20 wherein the emboss extends between the upper section and the lower section of the angled bracket.

22. The playstation according to claim 17 wherein the lower section of the angled bracket includes an emboss that serves to align the leg relative to the angled bracket when the leg is placed against the emboss.

23. The playstation according to claim 22 wherein the emboss includes a detent adapted to receive a head on a fastener, the fastener being used to secure the lower section of the angled bracket to the leg.

24. The playstation according to claim 17 wherein the support structure is a tower having a landing for supporting a child thereon.

25. The playstation according to claim 24 wherein the tower is secured to the first cross-beam, the second cross-beam and the upper section of the angled bracket at a position above the landing on the tower.

26. The playstation according to claim 17 wherein the lower section extends laterally and downwardly from the upper section to form an angle between the upper section and the lower section of the angled bracket.

27. The playstation according to claim 26 wherein the angle between the upper section and the lower section is between 90 degrees and 180 degrees.

28. The playstation according to claim 26 wherein the angle between the upper section and the lower section of the angled bracket is formed by bending the lower section relative to the upper section.

29. The playstation according to claim 26 wherein the angled bracket has a substantially triangular configuration prior to bending the lower section relative to the upper section.

30. The playstation according to claim 17 wherein the angled bracket is secured between the first cross-beam and the second cross-beam.

31. A playstation comprising:
   an angled bracket including an upper section and a lower section extending downward from the upper section,
   a first cross-beam secured against the upper section of the angled bracket,
   a second cross-beam secured against the upper section of the angled bracket, the angled bracket being secured between the first cross-beam and the second cross-beam, and the second cross-beam being substantially parallel to the first cross-beam,
   a leg secured to the lower section of the angled bracket, and
   a support structure secured to the first cross-beam, the second cross-beam and the upper section of the angled bracket.

32. The playstation according to claim 31 further comprising a first fastener for securing the upper section of the angled bracket to one of the first cross-beam and the second cross-beam.

33. The playstation according to claim 32 further comprising a second fastener for securing the upper section of the angled bracket to the first cross-beam and the second cross-beam.

34. The playstation according to claim 31 further comprising a center support extending between the support structure and the leg.

35. The playstation according to claim 31 wherein the angled bracket includes an emboss that serves to align one of the first cross-beam and the second cross-beam relative to the angled bracket when the cross-beam is placed against the emboss.

36. The playstation according to claim 35 wherein the emboss extends between the upper section and the lower section of the angled bracket.

37. The playstation according to claim 31 wherein the lower section of the angled bracket includes an emboss that serves to align the leg relative to the angled bracket when the leg is placed against the emboss.

38. The playstation according to claim 37 wherein the emboss includes a detent adapted to receive a head on a fastener, the fastener being used to secure the lower section of the angled bracket to the leg.

39. The playstation according to claim 31 wherein the support structure is a tower having a landing for supporting a child thereon.

40. The playstation according to claim 39 wherein the tower is secured to the first cross-beam, the second cross-beam and the upper section of the angled bracket at a position above the landing on the tower.

41. The playstation according to claim 31 wherein the lower section extends laterally and downwardly from the upper section to form an angle between the upper section and the lower section of the angled bracket.

42. The playstation according to claim 41 wherein the angle between the upper section and the lower section is between 90 degrees and 180 degrees.

43. The playstation according to claim 41 wherein the angle between the upper section and the lower section of the angled bracket is formed by bending the lower section relative to the upper section.

44. The playstation according to claim 41 wherein the angled bracket has a substantially triangular configuration prior to bending the lower section relative to the upper section.

\* \* \* \* \*